United States Patent
Lever

(10) Patent No.: US 9,432,109 B2
(45) Date of Patent: Aug. 30, 2016

(54) SATELLITE COMMUNICATION TERMINAL INSTALLATION

(71) Applicant: Gilat Satellite Networks Ltd., Petah Tikva (IL)

(72) Inventor: Dubi Lever, Hashmonaim (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 0 days.

(21) Appl. No.: 14/472,339

(22) Filed: Aug. 28, 2014

(65) Prior Publication Data

US 2015/0063428 A1     Mar. 5, 2015

Related U.S. Application Data

(60) Provisional application No. 61/873,504, filed on Sep. 4, 2013.

(51) Int. Cl.
    *H04B 7/185*      (2006.01)

(52) U.S. Cl.
    CPC .................. *H04B 7/18517* (2013.01)

(58) Field of Classification Search
    CPC ........................ H04B 7/185; H04B 7/18517
    USPC ................... 375/211, 219, 222, 224, 228
    See application file for complete search history.

(56) References Cited

U.S. PATENT DOCUMENTS

| | | | |
|---|---|---|---|
| 6,348,986 B1* | 2/2002 | Doucet | G02B 6/4405 398/128 |
| 7,774,493 B1* | 8/2010 | Damle | H04J 3/0608 709/236 |
| 2009/0021424 A1* | 1/2009 | Wahlberg | H04B 7/18536 342/352 |
| 2011/0121952 A1* | 5/2011 | Bonicatto | H04B 3/54 340/12.32 |
| 2011/0151777 A1* | 6/2011 | Kim | H04B 7/18528 455/13.4 |

\* cited by examiner

*Primary Examiner* — Freshteh N Aghdam
(74) *Attorney, Agent, or Firm* — Banner & Witcoff, Ltd.

(57) ABSTRACT

A satellite communication terminal may comprise an outdoor part and an indoor part. Either the indoor part or the outdoor part may comprise a modem configured for communicating with a hub of a satellite communication system via a satellite and the outdoor part of the terminal. Methods are presented for sending indications from the outdoor part of the terminal to the modem, for example, to provide a person that may be installing the terminal with some control over the flow of the installation process while remaining outside (e.g., in the vicinity of the outdoor part of the terminal). In some embodiments, such indications may be used for triggering cross-polarization measurements and/or providing more elaborate information to the person installing the terminal without the need to leave the outdoor part of the terminal.

29 Claims, 4 Drawing Sheets

SATELLITE COMMUNICATION TERMINAL INSTALLATION

PRIORITY CLAIM

This application claims priority to U.S. Provisional Patent Application Ser. No. 61/873,504, filed Sep. 4, 2013, and entitled "Satellite Communication Terminal Installation," the disclosure of which is incorporated by reference herein in its entirety and made part hereof.

FIELD

Aspects of the disclosure pertain to the field of satellite communication systems.

BACKGROUND

The market for broadband Internet access over satellite has been evolving since the beginning of the millennia. In the early days, satellite communication systems for providing broadband Internet access were operating primarily over Ku-band satellites. In recent years, the broadband Internet access market has been shifting towards operation over higher frequency bands, primarily the Ka-band. This is mainly because operating at higher frequency bands enables reduction of the operating expenditure (OPEX) per user, thus making use of such systems for servicing consumers economically feasible.

In many regions of the world, end-users (consumers) are allowed to install two-way satellite communication terminals by themselves. An end-user may opt to self-install a satellite communication terminal rather than to use services of a professional installer. An option to self-install the terminal is highly important in satellite communication systems destined for the consumer market, as in such systems the cost of a professional installation tends to be on par with the price at which the terminal is being sold. Thus, a trend has evolved of providing two-way satellite communication terminals that can be self-installed.

Furthermore, methods have been developed for installing satellite communication terminals without requiring the expertise of a professional installer or use of specialized equipment often used by professional installers (such as spectrum analyzers, satellite receivers, etc.). Self-installing a satellite communication terminal involves assembly of the outdoor components (e.g., a satellite dish antenna and a transceiver), connecting the outdoor equipment to an indoor unit (modem) using inter-facility (IFL) cables, connecting the indoor unit to a personal computer (PC), and then using the PC for accessing the modem and launching the modem's antenna-pointing sequence. Once the antenna-pointing sequence has been launched, the user goes outside and points the dish antenna at the satellite. One method known to be used for helping the user in pointing the dish antenna at the satellite is based on providing the user audio feedbacks indicating signal reception strength. Once the user is satisfied with the audio feedback (i.e., the audio feedback indicates acceptable reception strength), the user returns indoors and uses the PC connected to the modem to complete the installation process.

In order to complete the installation, the modem and the satellite communication system's hub often assess the quality of the installation by measuring the terminal's signal quality, i.e., for receiving, transmitting, or both. In the event of insufficient reception level or insufficient transmission quality, the installation fails and the user has to go outside again to point the dish antenna at the satellite more accurately. One can find themselves going inside and outside several times, as there are no cost effective means for sending commands to the modem's application that manages the installation flow while being outdoors.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some aspects of the disclosure in a simplified form as a prelude to the description below.

A satellite communication terminal may comprise an outdoor part and an indoor part. The indoor part may comprise a modem configured for communicating with a hub of a satellite communication system via a satellite.

Aspects of the disclosure are directed to a method for interacting with a modem of a satellite communication terminal. The interacting may take place while the terminal is being installed and while a person interacting with the modem may be located in the vicinity of the outdoor part of the terminal. In some embodiments, interaction between a person and the modem while the person may be in the vicinity of the outdoor part of the terminal may be used any number of times throughout an installation process of the terminal, for example, during initial pointing of the antenna, during signal-level auditing, etc. In some embodiments, a person (e.g., an installer) that may be in the vicinity of the outdoor part of the terminal may use such interaction in order to signal the modem that a pointing process of the antenna has been concluded while remaining outdoors.

Aspects of the disclosure are directed to a method for detecting intentional reception obstruction patterns. For example, such obstructions may be interpreted as instructions to perform one or more predefined functions.

Aspects of the disclosure are directed to a satellite communication terminal. The terminal may be configured to detect intentional reception obstruction patterns, to interpret such patterns as instructions, and to perform one or more functions in accordance with said instructions.

BRIEF DESCRIPTION OF THE DRAWINGS

Figure 1:
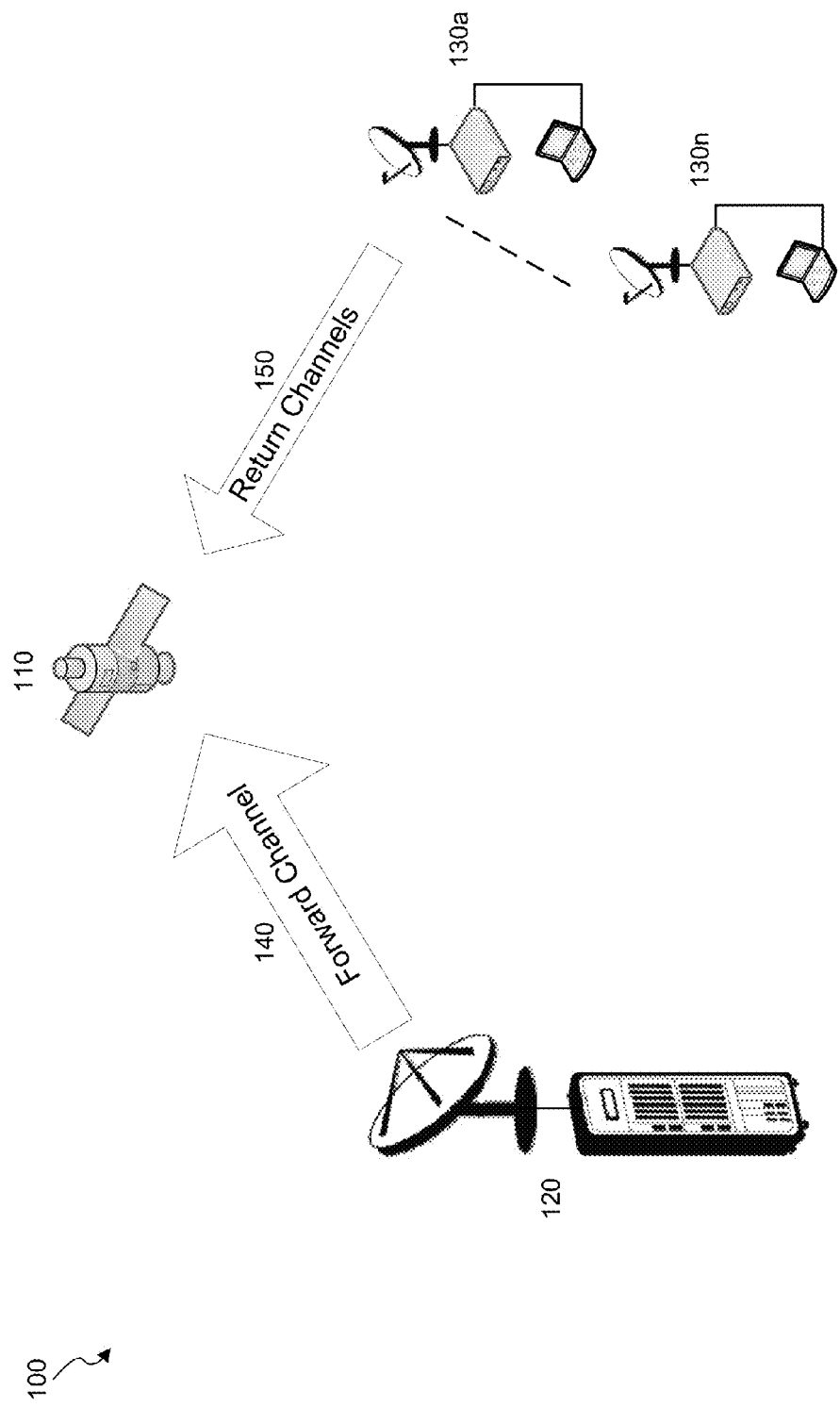
Figure 2:
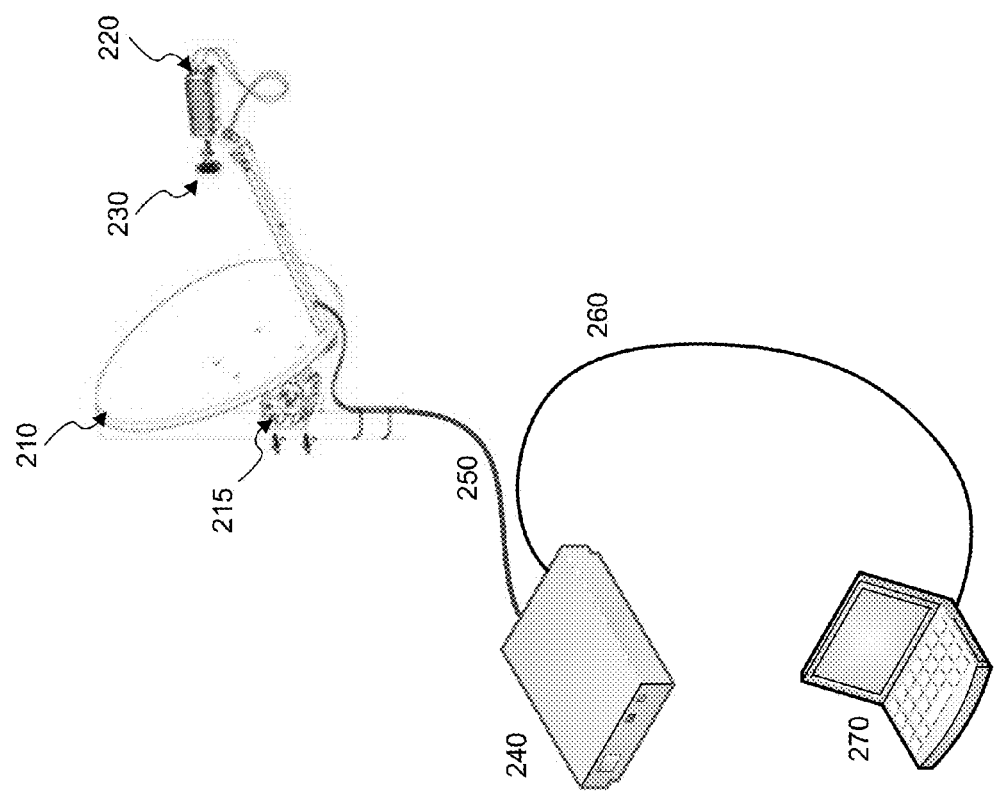
Figure 3:
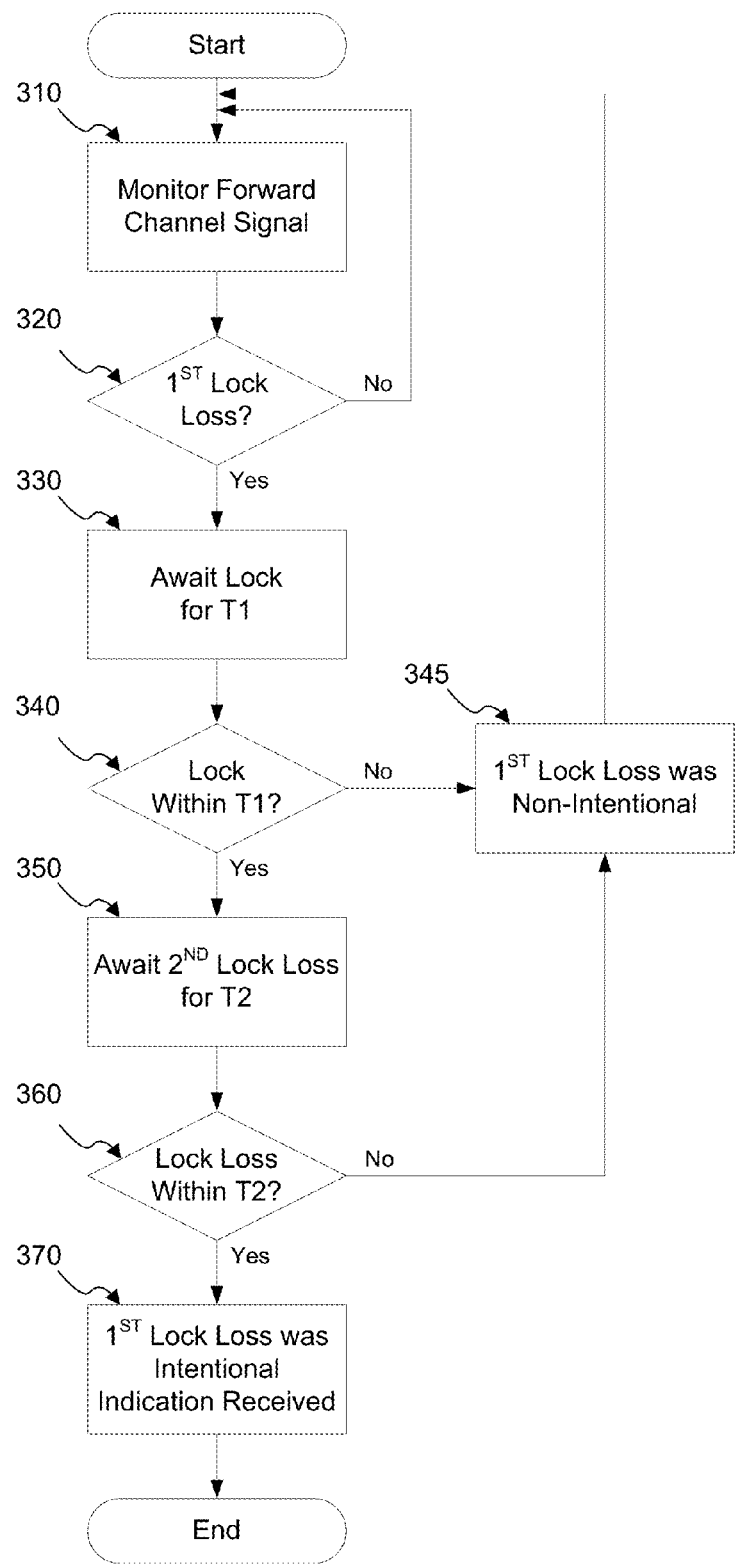
Figure 4:
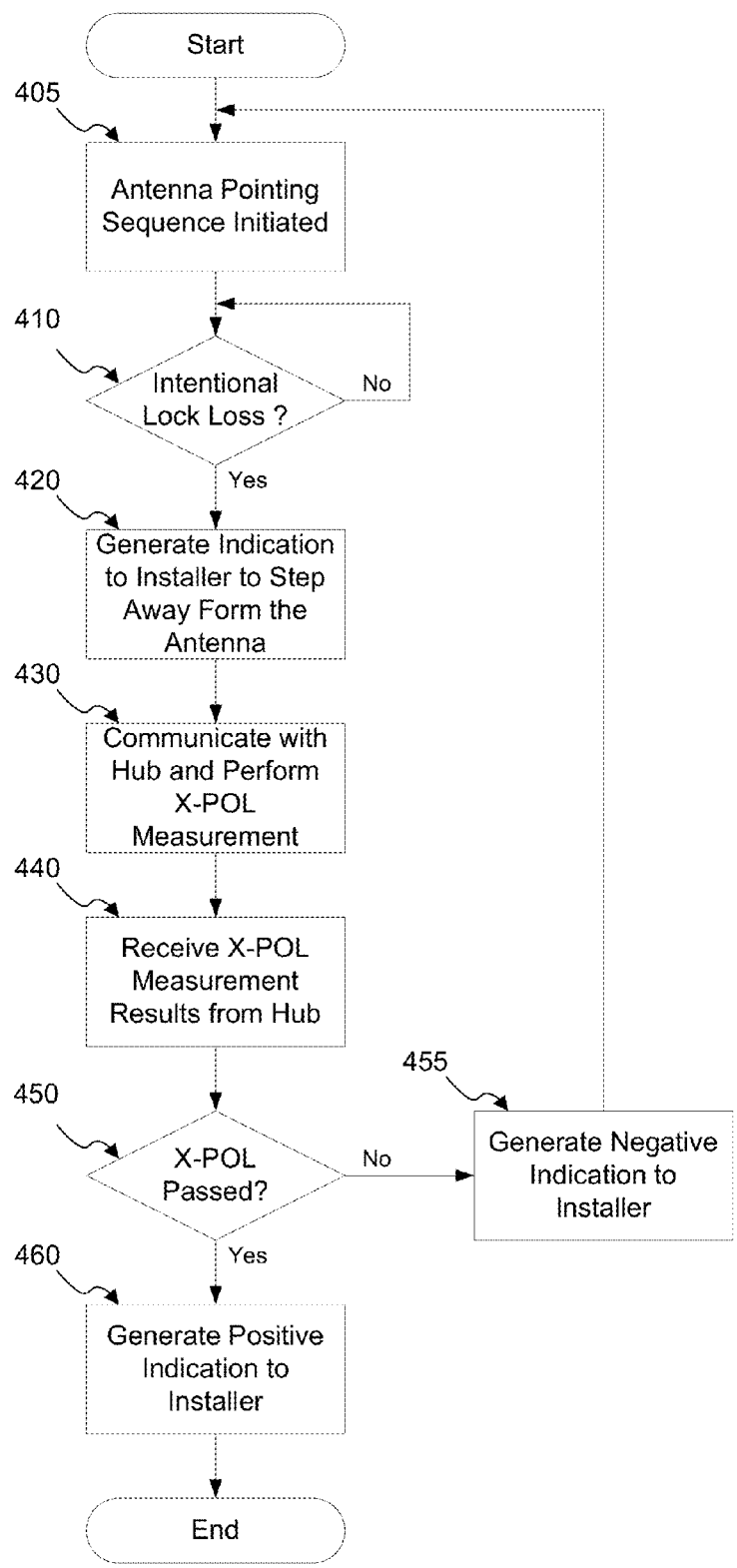

Having thus described the disclosure in general terms, reference will now be made to the accompanying drawings, which are not necessarily drawn to scale, and wherein:

FIG. 1 shows a satellite communication system in accordance with aspects of the disclosure;

FIG. 2 shows a satellite communication terminal in accordance with aspects of the disclosure;

FIG. 3 shows a block diagram of a signal lock pattern recognition algorithm in accordance with aspects of the disclosure; and FIG. 4 shows a block diagram of a terminal installation sequence in accordance with aspects of the disclosure.

DETAILED DESCRIPTION

Referring to FIG. 1, a satellite communication system 100 may comprise a plurality of terminals 130a-n and a hub station 120, wherein hub 120 and the terminals 130a-n may be configured to communicate via a satellite 110. Hub 120 may be configured to transmit, and terminals 130a-n may be configured to receive, a forward channel 140. Terminals 130*a-n* may be configured to transmit, and hub 120 may be configured to receive, one or more return channels 150.

Referring to FIG. 2, a first terminal of the satellite communication system 100 (for example, any of the terminals 130*a-n*) may comprise an outdoor part and an indoor part. The outdoor part may comprise a dish antenna reflector 210, a low-noise block (LNB), a block up-converter (BUC), and a feed 230. In some embodiments, said LNB and BUC may be incorporated together to form transceiver 220, for example, as shown in FIG. 2. The terminal's indoor part may comprise a modem 240. Modem 240 may include one or more interfaces that may be used for connecting the modem to the outdoor part of the terminal (250), and at least one interface that may be used for connecting (260) a personal computer (PC) 270 or any other suitable device (for example, but not limited to, a desktop computer, a laptop computer, a tablet computer or a smartphone) that may be used for accessing a management application of modem 240. In some embodiments, the management application of modem 240 may include or provide a hypertext page, which may be accessible using a browser that may be configured to use the Hyper Text Transfer Protocol (HTTP).

In some embodiments, the outdoor part of the terminal may incorporate the modem. For example, the modem may be incorporated into a transceiver, which may also incorporate the LNB and the BUC. In such embodiments, where the modem may be incorporated in the outdoor part, the indoor part of the first terminal may comprise at least an indoor apparatus, which may be configured to have at least one interface that may be used for connecting a personal computer or another suitable device and one or more interfaces that may be used for connecting the indoor apparatus to the outdoor part (for example, to the modem that may be included in the outdoor part). In some embodiments, the indoor apparatus may also include a power supply unit that may be configured to provide electrical power to the outdoor part over any of the one or more interfaces that may be used for connecting the indoor apparatus to the outdoor part. In some embodiments, the indoor part and the outdoor part may be connected using an Ethernet link. In some embodiments, the indoor apparatus and the outdoor part may be configured to transfer electrical power from the indoor apparatus to the outdoor part over the Ethernet link (e.g., Power over Ethernet (PoE)).

Installing the first terminal may include any of the steps of assembling the outdoor part of the terminal (e.g., mounting dish antenna reflector 210 on a pole (e.g., using a back-structure 215), mounting the outdoor electronics 220 and the feed 230 in their proper respective positions relative to dish reflector 210, etc.), connecting the outdoor part to the indoor part (e.g., to modem 240), for example, using inter-facility (IFL) cables (250), connecting PC 270 or another suitable device to modem 240 (or to an indoor apparatus (e.g., for embodiments in which the modem may be incorporated into the outdoor part)), accessing a management application of modem 240, and initiating or launching an antenna pointing sequence that modem 240 may be configured to provide or support. Once the antenna pointing sequence has been launched, a person, such as the installer of the terminal, may go outside to the vicinity of the outdoor part for at least the purpose of pointing the dish antenna at the satellite through which the first terminal may be configured to communicate with the hub of the satellite communication system.

Aspects of the disclosure are directed to a method for interacting with a modem of a satellite communication system. For example, interacting with modem 240 of the first terminal while the first terminal is being installed, and while the installer or any other person so interacting with the modem of the first terminal may be located in the vicinity of the outdoor part of the first terminal and having limited access to the modem's management application (e.g., due to their physical presence in the vicinity of the outdoor part). In some embodiments, interaction between a person and the modem of the first terminal, while the person may be in the vicinity of the outdoor part of the first terminal, may be used any number of times throughout an installation process of the first terminal, for example, during initial pointing of the antenna, during signal-level auditing, etc. In some embodiments, a person (e.g., an installer) in the vicinity of the outdoor part of the first terminal may use such interaction in order to signal the modem of the first terminal that a pointing process of the antenna has been concluded while remaining outdoors. The person (e.g., the installer) may wait for an indication from the modem of the first terminal that the installation has been successfully completed, whereas in case of a failure the person (e.g., the installer) may commence repointing of the antenna without going indoors and outdoors again. As will be appreciated, this may be particularly advantageous when the antenna is positioned on a roof and accessing it may involve climbing or other potentially hazardous actions.

While in the vicinity of the outdoor part, a person (e.g., the installer) may obstruct the line-of-site (LOS) between the satellite and the dish antenna reflector 210 of the first terminal, or the space between the antenna feed 230 and the reflector 210 of the first terminal (or both), for the purpose of causing the first terminal's modem 240 to lose lock on the forward channel signal 140 that the modem of the first terminal may be configured to receive from the hub 120 via the satellite 110.

The first terminal's modem may be configured to detect loss of lock on the forward channel signal at any one or more predetermined stages of the installation process and/or of the antenna pointing sequence. Upon detecting a first loss of lock on the forward channel signal, the modem of the first terminal may be configured to determine whether the first loss of lock has been intentional. In some embodiments, and in reference to FIG. 3, the modem of the first terminal may be configured to monitor the reception of the forward link signal (310) and upon detecting a first loss of lock on the forward channel signal (320) to expect regaining lock on the forward channel signal within a first interval (e.g., T1) (330). The modem of the first terminal may be configured, if lock on the forward channel signal may be regained before the first interval expires (340), to expect a second loss of lock within a second interval (e.g., T2) (350). The modem of the first terminal may be configured to determine that the first loss of lock on the forward channel signal may have been intentional (370) if a second loss of lock on the forward channel signal may be detected before the second interval expires (360). If lock on the forward channel signal might not be regained within the first interval (340) or if a second loss of lock on the forward channels signal might not be detected prior to expiry of the second interval (360), the modem of the first terminal may be configured to determine that the first loss of lock previously detected (320) may have been non-intentional (345) and to disregard it.

In some embodiments, for the purpose of avoiding confusion, the first terminal's modem 240 may be configured to differentiate an intentional loss of lock on the forward channel signal from a loss of lock that may result from the pointing process of the dish antenna (e.g., from changing the alignment of the dish antenna while scanning the sky for the satellite). For example, an intentional loss of lock on the forward channel may be of a short interval (e.g., shorter than said first interval) and may occur suddenly while the forward channel signal may be received at a level exceeding a preconfigured threshold. On the other hand, a loss of lock on the forward channel signal that may be associated with the pointing process of the dish antenna may be a relatively long one (e.g., longer than said first interval) and may be preceded by a gradual degradation in reception level.

The first terminal's modem 240 may be further configured to generate an audio indication and/or another type of indication, and/or to cause an audio indication and/or another type of indication to be generated in the vicinity of the outdoor part when expecting a second loss of lock on the forward channel signal. For example, the first terminal's modem 240 may be so configured for the purpose of alerting a person (e.g., the installer) that may be in the vicinity of the outdoor part of the first terminal to repeat the obstruction of the received signal in order to send a definitive indication to the terminal's modem and/or to confirm that the first loss of lock was indeed intentional.

In some embodiments, the audio indication may comprise a recorded speech message, and the modem of the first terminal may be configured to play the recorded message or otherwise cause a playback of the recorded message to occur in the vicinity of the outdoor part of the terminal. The message may indicate that a loss of lock on the forward channel signal has been detected and that a person (e.g., the installer) that may be in the vicinity of the outdoor part of the first terminal is to repeat the blocking of the satellite's signal within a specified interval if that person (e.g., the installer) wishes to send an indication to the modem confirming that the loss of lock was intentional. If said person (e.g., the installer) blocks the satellite's signal for the second time, the modem may be configured to play a positive speech indication or otherwise cause a playback of a positive speech message, and then continue to a next stage of the installation process. In some embodiments, the modem may be configured to use recorded speech messages in order to offer multiple options (e.g., through a speech-based menu) to a person (e.g., the installer) that may be in the vicinity of the outdoor part of the first terminal at various stages of the installation sequence.

In some embodiments, the audio indication may consist of a pattern of tones, for example, a pattern of beeps. In such embodiments, the modem may be configured to generate and/or to cause generation of one or more types of audible indications that may have various meanings, wherein the various meanings may be differentiated by the tones and/or patterns used. For example, different tone patterns (or beeps) may be used for indicating detection of lock loss on the forward channel signal, for providing positive acknowledgement upon detecting an intentional loss of lock, etc.

In some embodiments, the algorithm described above (e.g., in reference to FIG. 3) may be extended for at least the purpose of allowing a person (e.g., the installer) that may be in the vicinity of the outdoor part of the first terminal to send more than a single type of indication to the modem 240 of the first terminal. For example, after detecting a second loss of lock on the forward channels signal (e.g., 360 and 370), the modem may be configured to wait for another regaining of lock on the forward channel signal within a third interval (e.g., wherein the third interval may be or may not be of the same duration as said first interval). The modem of the first terminal may be configured, if lock on the forward channel signal may be regained before the third interval expires, to expect a third loss of lock within a fourth interval (e.g., wherein the fourth interval may be or may not be of the same duration as said second interval). The modem of the first terminal may be configured to determine that the first loss of lock on the forward channel signal may have been intentional and may constitute a first indication type if a third loss of lock on the forward channels signal might not be detected before the fourth interval expires, and further configured to determine that the first and second losses of lock on the forward channel signal may have been intentional and may constitute a second indication type if a third loss of lock on the forward channels signal may be detected before the fourth interval expires. It will be appreciated that the above technique may be further extended to support any number of different indications based on detecting the number of intentional blockings of the received signal.

Satellites often transmit and receive in two orthogonal polarizations, for example, in order to increase their capacity. In order to enable such operation, it may be necessary to ensure that transmissions in a first polarization may not leak into the spectrum of the second polarization at too-high a level, which may interfere with transmissions in the second polarization, and visa-versa. In order to so ensure, stations transmitting towards the satellite may be subjected to a cross-polarization (X-POL) measurement, following which the alignment of the station's antenna towards the satellite may have to be corrected in order to reduce the leaking transmission to an acceptable level. X-POL measurement may be necessary when the satellite operates in linear polarizations (e.g., vertical and/or horizontal polarizations), as may be the case for many Ku-band and C-band satellites. Many Ka-band satellites (yet perhaps not all of them), however, may transmit and receive using circular polarization (e.g., right hand and/or left hand polarization), and for these satellites, X-POL measurements may not be needed.

Thus, when a terminal is installed for operation over a satellite utilizing linear polarization(s), the installation process may require multiple X-POL measurements and antenna pointing sessions until a satisfactory X-POL result may be obtained. When an X-POL measurement yields an unsatisfactory result, the person installing the terminal may improve the alignment of the terminal's antenna (e.g., outdoors) and may indicate to the satellite communication system that another X-POL measurement may be performed (e.g., indoors), hence said person may find himself going inside and outside several times.

In some embodiments, a method for performing a cross-polarization measurement is provided. For example, the cross-polarization measurement method may be performed for the first terminal while the first terminal is being installed and while the person that may be installing the first terminal may be in the vicinity of the outdoor part of the first terminal and thus have limited access to the modem's management application (e.g., due to their physical presence in the vicinity of the outdoor part).

While in the vicinity of the outdoor part of the first terminal and upon receiving satisfying indications from the indoor part (e.g., from modem 240) regarding the reception level of the received forward channel signal, the person installing the first terminal may intentionally obstruct the reception of the forward channel signal, for example, as previously described, for at least the purpose of indicating to the modem 240 that the antenna-pointing sequence has been concluded. In reference to FIG. 4, the modem of the first terminal, after an antenna pointing sequence may have been initiated (405), may be configured to detect said intentional obstruction to the reception of the forward channel signal (410) (for example, as previously described in reference to FIG. 3 and/or as per any of the additional embodiments previously described). In some embodiments, upon detecting said intentional obstruction, the modem of the first terminal may be further configured to generate an audio indication (for example, including but not limited to a pattern of tones, a playback of a recorded message, or any other type of audible indication) and/or to cause an audio indication to be generated in the vicinity of the outdoor part, for example, for the purpose of alerting any person that may be in the vicinity of the outdoor part of the first terminal to step away and/or distance themselves from the antenna (420) (e.g., in order not to expose any such person to electromagnetic radiation while the terminal may be transmitting towards the satellite), at least until a further indication might be given.

The modem of the first terminal, upon detecting said intentional obstruction to the reception of the forward channel signal, may be configured to continue the installation sequence and to communicate with the hub 120 of the satellite communication system for at least the purpose of performing X-POL measurement (430). The modem of the first terminal, upon concluding the X-POL measurement and receiving its results (440) (e.g., actual measurement results or a pass/fail indication), may be configured to generate an audio indication (e.g., including but not limited to a pattern of tones, a playback of a recorded message, or any other type of an audible indication) and/or to cause an audio indication to be generated in the vicinity of the outdoor part for the purpose of informing a person that may be installing the first terminal whether the X-POL measurement passed (460) or failed (455), whereas each of the at least two possible results may be represented by a different indication (e.g., different pattern of tones or a different speech message). If the measurement passed an applicable success criteria (450), the modem of the first terminal may be configured to provide a positive indication (460) that in some embodiments may also indicate a successful completion of the installation process. If the measurement failed to meet the applicable success criteria (450), the modem of the first terminal may be configured to generate a negative indication (455), resume the antenna pointing sequence (405), and wait for another signal block indication (410), e.g., from the person installing the first terminal, before trying another X-POL measurement.

In some embodiments, the first terminal (e.g., in general and/or modem 240 in particular) may be configured to transmit a carrier wave (CW) signal towards the hub 120 of the satellite communication system (e.g., for at least the purpose of cross-polarization measurement). The hub may be configured to measure a difference in power between two CW signals corresponding to the CW signal transmitted by the first terminal. The two CW signals may be received at the hub, one at the correct polarization (CO-POL) and the other at the cross polarization (X-POL). The hub may be further configured to report the measured difference to the first terminal (e.g., to modem 240) and the first terminal may be configured to generate an audio indication (e.g., including but not limited to a pattern of tones, a playback of a recorded message, or any other type of audible indication) and/or to cause an audio indication to be generated in the vicinity of the outdoor part of the first terminal (e.g., in accordance with the reported measurement). A person installing the first terminal (e.g., the installer) may consider the audible indication and thereafter, if necessary, may apply modifications to the outdoor part of the terminal for at least the purpose of achieving a higher difference in power between the CO-POL signal and the X-POL signal. In some embodiments, a CW signal might not be transmitted simultaneously with generation of audible indications. In such embodiments, the modem 240 may be configured to cease or suspend transmission of the CW signal while generating an audible indication or causing an audio indication to be generated in the vicinity of the outdoor part of the first terminal. Such interleaving may be desirable in any event, for at least the purpose of protecting an installer from exposure to electromagnetic radiation (e.g., from transmission of the terminal towards the satellite) while performing said modifications to the outdoor part of the terminal.

In some embodiments, the outdoor part of the first terminal may also comprise a polarizer, which may be configured to enable adjustment of at least the polarization of the terminal transmission. After a first X-POL measurement has been performed and a first corresponding (audible) indication provided (e.g., by the first terminal), the installer may slightly rotate the polarizer (e.g., by about 2 degrees) in a direction which may be randomly selected (e.g., from two possible directions). The installer may then signal the modem of the first terminal to repeat the X-POL measurement, e.g., by intentionally obstructing reception of the forward channel signal as previously described. Once a second measurement has been performed and its results reported to the first terminal (e.g., to modem 240), a second (audible) indication corresponding to the second measurement may be generated as previously described. The second (audible) indication may further indicate whether the difference in power between the CO-POL signal and the X-POL signal has increased (improved) or decreased (deteriorated) relative to the first measurement. Considering the second (audible) indication, the installer may determine at least whether to further rotate the polarizer in the direction previously selected (e.g., if the second measurement is better than the first one) or to rotate the polarizer in the direction opposite to the previously selected direction (e.g., if the second measurement is worse than the first one). This process may be repeated as many times as may be needed until the polarizer may be rotated to a position that may yield a sufficient power difference between the CO-POL signal and the X-POL signal.

An installer engaged in pointing the antenna of a terminal at a satellite may ascertain based on audible indications, such as sound patterns, that the reception level of the forward channel signal may be getting stronger or weaker (e.g., that the pointing gets more accurate or less accurate respectively). Yet, the installer might not be able to receive a clear indication or a measurement result of the actual reception level.

In some embodiments, while a person installing the first terminal is engaged in the process of pointing the dish antenna of the first terminal towards the applicable satellite, said person may signal the modem of the first terminal, for example, by intentionally obscuring the reception of the forward channel signal in a predefined pattern, that he may wish to activate a speech generation and/or playback functionality of the modem (or of any other component of the terminal that may be controlled by the modem) for at least the purpose of receiving more information regarding the reception level of the forward channel signal. In some embodiments, said additional information may be of descriptive characteristics, for example, using terms like "weak," "medium," "strong," and/or in any combinations of such terms with one another and/or with other terms like but not limited to "very" (e.g., "very weak"). In some embodiments, said additional information may be an actual read-out of the measured reception level of the forward channel signal (e.g., a speech message like "seven dot five dee-bee").

In such embodiments, the modem 240 of the first terminal may be configured to detect intentional losses of lock on the forward channel signal (e.g., as previously described in reference to FIG. 3 and/or as per any of the additional embodiments previously described), to determine whether the detected lock loss pattern matches a predefined pattern corresponding to engaging the requested speech generation and/or playback functionality, and in response to so positively determining to generate or cause the generation of the appropriate speech indication in the vicinity of the outdoor part of the first terminal.

Various aspects of the disclosure may be embodied as one or more methods, systems, apparatuses (e.g., components of a satellite communication network), and/or computer program products. Accordingly, those aspects may take the form of an entirely hardware embodiment, an entirely software embodiment, an entirely firmware embodiment, or an embodiment combining firmware, software, and/or hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In some embodiments, one or more computer readable media storing instructions may be used. The instructions, when executed, may cause one or more apparatuses to perform one or more acts described herein. The one or more computer readable media may comprise transitory and/or non-transitory media. In addition, various signals representing data or events as described herein may be transferred between a source and a destination in the form of electromagnetic waves traveling through signal-conducting media such as metal wires, optical fibers, and/or wireless transmission media (e.g., air and/or space).

Modifications may be made to the various embodiments described herein by those skilled in the art. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A method for interacting with a modem of a satellite communication terminal, wherein the satellite communication terminal comprises at least an outdoor part and an indoor part that are interconnected, the method comprising:
   intentionally obstructing, at the outdoor part and in accordance with one or more predefined patterns, reception of a signal that the modem is configured to receive from a satellite via the outdoor part;
   detecting, at the modem, a loss of the signal; and
   responsive to a determination that the loss of the signal is in accordance with the one or more predefined patterns, performing, at the modem, one or more actions in accordance with at least one of the one or more predefined patterns or a state of the modem.

2. The method of claim 1, wherein the outdoor part includes a dish antenna reflector, and wherein said obstructing comprises obstructing a line-of-site between said satellite and the dish antenna reflector to cause said modem to lose lock on said signal.

3. The method of claim 1, wherein the outdoor part includes a dish antenna reflector and a feed, and wherein said obstructing comprises obstructing a space between the dish antenna reflector and the feed to cause said modem to lose lock on said signal.

4. The method of claim 1, wherein said interacting occurs while the satellite communication terminal is being installed.

5. The method of claim 1, wherein the outdoor part includes a dish antenna, and wherein said interacting signals the modem that a step in a pointing process of the dish antenna has been concluded.

6. The method of claim 1, further comprising producing one or more indications in a vicinity of the outdoor part.

7. The method of claim 6, wherein the one or more indications comprise audible speech indications, and wherein said interacting triggers the modem to cause the audible speech indications to provide reception level information corresponding to the signal.

8. The method of claim 1, wherein said interacting triggers the modem to engage in a cross-polarization measurement.

9. The method of claim 1, wherein the indoor part comprises the modem, an interface for connecting a computing device, and an interface for connecting the outdoor part.

10. The method of claim 1, wherein the outdoor part comprises the modem, and wherein the indoor part comprises:
    an interface for connecting a computing device;
    an interface for connecting the outdoor part; and
    a power supply configured to provide electrical power to the outdoor part over the interface for connecting the outdoor part.

11. The method of claim 10, wherein the indoor part and the outdoor part are connected by an Ethernet link, and wherein the indoor part is configured to transfer the electrical power to the outdoor part over the Ethernet link.

12. A method comprising:
    transmitting, from a modem of a satellite communication terminal, a carrier wave (CW) signal to a hub of a satellite communication system;
    receiving, at the modem and from the hub, a first measurement of a difference in power between a co-pol signal and a cross-pol signal corresponding to the CW signal;
    generating, in a vicinity of an outdoor part of the satellite communication terminal, an indication corresponding to the first measurement; and
    responsive to detecting that a first loss of lock on a received signal was intentional, inducing a second measurement of the difference in power.

13. The method of claim 12, further comprising:
    receiving, at the modem and from the hub, the second measurement; and
    generating, in the vicinity of the outdoor part of the satellite communication terminal and based on a difference between the second measurement and the first measurement, an indication of whether the difference in power has increased or decreased relative to the first measurement.

14. The method of claim 12, further comprising determining that the first loss of lock was not intentional based on at least one of:
    determining that a lock on the received signal was not regained within a first interval following the first loss of lock; or responsive to determining that the lock on the received signal was regained within the first interval, waiting a second interval for a second loss of lock on the received signal and failing to detect, within the second interval, the second loss of lock.

15. The method of claim 12, further comprising:
responsive to determining that a lock on the received signal was regained within a first interval following the first loss of lock on the received signal, waiting a second interval for a second loss of lock on the received signal; and
responsive to detecting, within the second interval, the second loss of lock on the received signal, determining that the first loss of lock on the received signal was intentional.

16. The method of claim 15, further comprising determining that the first loss of lock was intentional further based on a reception level of the received signal exceeding a predefined threshold at a time preceding the first loss of lock.

17. The method of claim 15, wherein the satellite communication system further comprises an indoor part interconnected to the outdoor part, the method further comprising causing an indication to be generated in a vicinity of the outdoor part during at least one of a portion of the second interval or in response to detecting the second loss of lock.

18. The method of claim 17, wherein the indoor part and the outdoor part are connected by an Ethernet link, and wherein the indoor part is configured to transfer electrical power to the outdoor part over the Ethernet link.

19. The method of claim 17, wherein the indication comprises an audible speech message.

20. The method of claim 15, comprising:
after detecting the second loss of lock, waiting a third interval to regain lock on the received signal;
responsive to detecting a lock on the received signal during the third interval, waiting a fourth interval for a third loss of lock on the received signal; and
responsive to detecting, within the fourth interval, the third loss of lock, determining that the second loss of lock was intentional.

21. A modem of a satellite communication terminal, the modem configured to:
detect a loss of lock on a signal that the modem is configured to receive;
determine that the loss of lock on the signal is intentional, wherein the determining that the loss of lock on the signal is intentional comprises determining that the loss of lock is in accordance with one or more predefined patterns; and
perform, in response to determining that the loss of lock on the signal is in accordance with the one or more predefined patterns, one or more actions in accordance with at least one of the one or more predefined patterns or a state of the modem.

22. The modem of claim 21, further configured to determine that the loss of lock on the signal was not intentional based on at least one of:
a determination that a lock on the signal was not regained within a first interval following the loss of lock on the signal; or
responsive to a determination that the lock on the signal was regained within the first interval, waiting a second interval for a second loss of lock on the signal and failing to detect, within the second interval, the second loss of lock on the signal.

23. The modem of claim 21, wherein determining whether the loss of lock on the signal was intentional comprises determining that the loss of lock on the signal was intentional based on a reception level of the signal exceeding a predefined threshold at a time preceding the loss of lock on the signal.

24. The modem of claim 21, wherein determining whether the loss of lock on the signal was intentional comprises:
responsive to determining that a lock on the signal was regained within a first interval following the loss of lock on the signal, waiting a second interval for a second loss of lock on the signal; and
responsive to detecting, within the second interval, the second loss of lock on the signal, determining that the loss of lock on the signal was intentional.

25. The modem of claim 24, wherein the satellite communication terminal comprises an outdoor part and an indoor part that are interconnected, and wherein the modem is configured to cause an indication to be produced in a vicinity of the outdoor part at least one of during a portion of the second interval or in response to detecting the second loss of lock.

26. The modem of claim 25, wherein the indication comprises an audible speech message.

27. The modem of claim 25, further configured to:
after detecting the second loss of lock, wait a third interval to regain lock on the signal;
responsive to detecting a lock on the signal during the third interval, wait a fourth interval for a third loss of lock on the signal; and
responsive to detecting, within the fourth interval, the third loss of lock, determine that the second loss of lock was intentional.

28. The modem of claim 25, wherein the indoor part and the outdoor part are connected by an Ethernet link, and wherein the indoor part is configured to transfer electrical power to the outdoor part over the Ethernet link.

29. The modem of claim 25, wherein the outdoor part includes a dish antenna reflector and a feed, and wherein the indoor part comprises the modem, an interface for connecting a computing device, and an interface for connecting the outdoor part.

* * * * *